United States Patent
Ha et al.

(10) Patent No.: US 10,696,329 B2
(45) Date of Patent: Jun. 30, 2020

(54) AUTOMOTIVE FRONT SIDE FRAME

(71) Applicant: POSCO, Pohang-si, Gyeongsangbuk-do (KR)

(72) Inventors: Ji-Woong Ha, Incheon (KR); Jae-Hyun Kim, Incheon (KR); Yeon-Sik Kang, Incheon (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 78 days.

(21) Appl. No.: 15/743,983

(22) PCT Filed: Feb. 17, 2016

(86) PCT No.: PCT/KR2016/001590
§ 371 (c)(1),
(2) Date: Jan. 11, 2018

(87) PCT Pub. No.: WO2017/018626
PCT Pub. Date: Feb. 2, 2017

(65) Prior Publication Data
US 2018/0208246 A1    Jul. 26, 2018

(30) Foreign Application Priority Data

Jul. 27, 2015  (KR) .......................... 10-2015-0105897

(51) Int. Cl.
*B62D 21/15*    (2006.01)
*B21D 7/16*    (2006.01)
(Continued)

(52) U.S. Cl.
CPC ............. *B62D 21/152* (2013.01); *B21D 7/16* (2013.01); *B62D 21/07* (2013.01); *B62D 21/157* (2013.01); *B62D 29/007* (2013.01)

(58) Field of Classification Search
CPC ............................ B62D 21/07; B62D 21/152
See application file for complete search history.

(56) References Cited

U.S. PATENT DOCUMENTS 7,540,556 B2 *  6/2009  Yamada ............... B62D 21/152
                                                       296/187.09
8,382,199 B2 *  2/2013  Bodin .................. B62D 21/152
                                                       280/784

(Continued)

FOREIGN PATENT DOCUMENTS

CN    101678864 A    3/2010
CN    103796905 A    5/2014

(Continued)

OTHER PUBLICATIONS

International Search Report dated May 18, 2016 issued in International Patent Application No. PCT/KR2016/001590 (with English translation).

(Continued)

*Primary Examiner* — Nicole T Verley
(74) *Attorney, Agent, or Firm* — Morgan, Lewis & Bockius LLP

(57) ABSTRACT

An automotive front side frame including a bent portion having a bent form, in at least a portion, comprises an outer frame including a front outer portion and a rear outer portion disposed further to a rear of a vehicle frame than the front outer portion and formed to have tensile strength higher than tensile strength of the front outer portion; and an inner frame including a front inner portion and a rear inner portion disposed further to the rear of the vehicle frame than the front inner portion and formed to have tensile strength higher than tensile strength of the front inner portion.

8 Claims, 7 Drawing Sheets

(51) Int. Cl.
*B62D 21/07* (2006.01)
*B62D 29/00* (2006.01)

(56) References Cited

U.S. PATENT DOCUMENTS

| | | | | |
|---|---|---|---|---|
| 9,211,913 | B2* | 12/2015 | Ohta | B62D 21/152 |
| 9,764,765 | B2* | 9/2017 | Takeda | B62D 21/152 |
| 9,956,991 | B1* | 5/2018 | Nishikawa | B62D 21/152 |
| 10,160,495 | B2* | 12/2018 | Hasegawa | B62D 21/15 |
| 2006/0125226 | A1 | 6/2006 | Barbat et al. | |
| 2007/0035118 | A1 | 2/2007 | Ni et al. | |
| 2010/0084892 | A1 | 4/2010 | Yoshida et al. | |
| 2014/0239671 | A1 | 8/2014 | Mori | |
| 2018/0201323 | A1* | 7/2018 | Onoda | B62D 21/03 |
| 2019/0016389 | A1* | 1/2019 | Kamei | B62D 21/152 |

FOREIGN PATENT DOCUMENTS

| | | |
|---|---|---|
| EP | 1738998 A1 | 1/2007 |
| EP | 2143621 A1 | 1/2010 |
| KR | 10-1998-0045537 U | 9/1998 |
| KR | 10-1999-020458 A | 3/1999 |
| KR | 10-2003-0089612 A | 11/2003 |
| KR | 10-2009-0064180 A | 6/2009 |
| KR | 10-0929527 B1 | 12/2009 |
| KR | 10-2012-0074134 A | 7/2012 |
| KR | 10-2013-0001427 A | 1/2013 |
| KR | 10-2014-0017324 A | 2/2014 |
| KR | 10-2015-0002925 A | 1/2015 |
| WO | 2008/123506 A1 | 10/2008 |
| WO | 2010/126423 A1 | 11/2010 |
| WO | 2012/091346 A2 | 7/2012 |
| WO | 2013061408 A1 | 5/2013 |

OTHER PUBLICATIONS

Extended European Search Report dated Jul. 12, 2018 issued in European Patent Application No. 16830660.3.
Japanese Office Action dated Jan. 22, 2019 issued in Japanese Patent Application No. 2018-503748.
Office Action issued in corresponding Chinese Application No. 201680044078.0, dated Jul. 1, 2019.

* cited by examiner

[Drawings]

| | | TARGET | MODEL OF RELATED ART | PRESENT DISCLOSURE |
|---|---|---|---|---|
| USNCAP Full Frontal Impact Test | TTZV [ms] | ≥ 70.0 | 91.1 | 79.5 |
| | MAXIMUM DECELERATION RATE | 35G ~ 45G | 33.2G | 43.4G |
| | EFFECTIVE DECELERATION RATE | ≤ 30G | 19.6G | 20.9G |

FIG. 10

| | | | Target | Model Of Related art | Present Disclosure | |
|---|---|---|---|---|---|---|
| IIHS Small Overlap Crash Test | Lower Occupant Compartment | Lower Hinge Pillar Max. [mm] | ≤120 | 214.9 | 47.4 | (Good) |
| | | Footrest [mm] | ≤120 | 298.7 | 115.1 | |
| | | Left Toe Pan [mm] | ≤120 | 249.9 | 113.8 | |
| | | Brake Peda [mm] | ≤120 | – | – | |
| | | Parking Brake [mm] | ≤120 | – | – | |
| | | Rocker Panel Lateral Avg. [mm] | ≤40 | 20.3 | 11.9 | |
| | Upper Occupant Compartment | Steering Column Rearward [mm] | ≤40 | 148.7 | 12.0 | |
| | | Upper Hinge Pillar Max. [mm] | ≤60 | 223.7 | 59.3 | |
| | | Upper Dash [mm] | ≤60 | 223.1 | 56.7 | |
| | | Lower Instrument Panel [mm] | ≤60 | 224.6 | 53.8 | |

AUTOMOTIVE FRONT SIDE FRAME

CROSS REFERENCE

This patent application is the U.S. National Phase under 35 U.S.C. § 371 of International Application No. PCT/KR2016/001590, filed on Feb. 17, 2016, which claims the benefit of Korean Patent Application No. 10-2015-0105897, filed on Jul. 27, 2015, the entire contents of each are hereby incorporated by reference.

TECHNICAL FIELD

The present disclosure relates to an automotive front side frame, and in more detail, to an exemplary embodiment in which safety of a passenger may be ensured by mitigating effects of an impact applied to a vehicle.

BACKGROUND ART

In general, testing has been carried out in order to secure the safety of passengers in the event of an automobile crash, which is an important factor in ensuring the stability of an automobile. In various countries, safety standards in the event of such crashes are regulated and may be itemized, including import restrictions.

For example, the Insurance Institute for Highway Safety (IIHS) has conducted a frontal crash performance test and a small overlap frontal crash performance test, an overlap crash test in the case of a crash involving 25% of a front portion of a vehicle.

In the meantime, as illustrated in FIG. 1, in the case of pick-up trucks having a linear frame, a front side frame 1 in a portion in which an engine is mounted is formed of a single material having a non-linear shape.

Such a frontal crash performance test of pick-up trucks has been developed to set frontal crash performance indices in such a manner that the time to zero velocity (TTZV) is 70 ms or more, the maximum deceleration rate is about 40 G, where 1 G is 9.8 m/s², and the effective deceleration rate is 30 G or less, until the speed of a pick-up truck reaches 0 after crashing into a steel wall.

The results of a frontal crash performance test, illustrated in FIG. 2, represent a TTZV of 91.1 ms, a maximum deceleration rate of 33.2 G, and an effective deceleration rate of 19.6 G.

In other words, in the frontal crash performance test illustrated in FIG. 2, transformation may not substantially occur in a rear portion of the front side frame 1 in which an engine is mounted. Bending transformation may only occur in a first bent portion 31 and a second bent portion 32 of a bent portion 30 having a bent form, formed in the front side frame 1, thereby satisfying target performance by absorbing energy.

However, the results of a small overlap frontal crash performance test illustrated in FIG. 3 may not satisfy target performance. It can be confirmed in FIG. 4 that excessive transformation of a passenger cabin on which a passenger rides occurs.

Thus, research into an automotive front side frame, satisfying an entirety of the frontal crash performance test and the small overlap frontal crash test, described above, is required.

DISCLOSURE

Technical Problem

An aspect of the present disclosure may provide an automotive front side frame, satisfying an entirety of a frontal crash performance test and a small overlap frontal crash test.

Technical Solution

According to an aspect of the present disclosure, an automotive front side frame including a bent portion having a bent form, in at least a portion, comprises an outer frame including a front outer portion and a rear outer portion disposed further to a rear of a vehicle frame than the front outer portion and formed to have tensile strength higher than tensile strength of the front outer portion; and an inner frame including a front inner portion and a rear inner portion disposed further to the rear of the vehicle frame than the front inner portion and formed to have tensile strength higher than tensile strength of the front inner portion.

In addition, the inner frame of the automotive front side frame according to an exemplary embodiment may be molded using a tailor welded blank (TWB) to allow the rear inner portion to be formed using a material having tensile strength higher than that of the front inner portion.

The front inner portion of the automotive front side frame according to an exemplary embodiment may be formed using a material having tensile strength of 600 MPa to 800 MPa, and the rear inner portion may be formed using twinning-induced plasticity (TWIP) steel having tensile strength of 1100 MPa to 1500 MPa and an elongation percentage of 15% to 60%.

The inner frame of the automotive front side frame according to an exemplary embodiment may further comprise a joint portion connecting the front inner portion to the rear inner portion. The joint portion may be disposed in a portion not including a portion in which the bent portion is formed.

The bent portion of the automotive front side frame according to an exemplary embodiment may comprise a first bent portion and a second bent portion formed further to the rear of the vehicle frame than the first bent portion. The joint portion may be provided in a position between the first bent portion and the second bent portion.

The outer frame of the automotive front side frame according to an exemplary embodiment may be formed by rapidly cooling the rear outer portion faster than the front outer portion to allow the rear outer portion to be heat-treated to have tensile strength higher than that of the front outer portion.

The front outer portion and the rear outer portion of the automotive front side frame according to an exemplary embodiment may be formed using a material having tensile strength of 600 MPa to 800 MPa before heat treatment, and the rear outer portion may be formed in such a manner that tensile strength after heat treatment is changed to within a range of 1100 MPa to 1500 MPa.

In addition, the outer frame of the automotive front side frame according to an exemplary embodiment may further comprise a transition portion, a transition zone in which the front outer portion is changed to the rear outer portion. The transition portion may be disposed in a portion not including a portion in which the bent portion is formed.

The bent portion of the automotive front side frame according to an exemplary embodiment may comprise a first bent portion and a second bent portion formed further to the rear of the vehicle frame than the first bent portion. The transition portion may be provided in a position between the first bent portion and the second bent portion.

Advantageous Effects

According to an aspect of the present disclosure, an automotive front side frame may protect a passenger in a vehicle by absorbing and mitigating effects of a crash in the event of a crash against a front face of the vehicle, as well as in the case of an overlap crash involving 25% of a front portion of the vehicle.

As a result, evaluation indices for automotive stability tests, or the like, of various countries may be satisfied.

DESCRIPTION OF DRAWINGS

FIG. 10 is a table illustrating comparison results of automotive front side frames of an exemplary embodiment and of the related art, in the event of the small overlap crash.

BEST MODE FOR INVENTION

Hereinafter, embodiments of the present inventive concept will be described with reference to the attached drawings. The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The contents of the present inventive concept described below may have a variety of configurations and propose only a required configuration herein, but are not limited thereto.

An automotive front side frame 1 according to an exemplary embodiment relates to an exemplary embodiment in which safety of a passenger may be ensured by mitigating effects of an impact applied to a vehicle.

In other words, the automotive front side frame 1 according to an exemplary embodiment may protect a passenger in a vehicle by mitigating effects of a crash F in the event of a crash F against a front face of the vehicle, as well as in the case of an overlap crash F involving 25% of a front portion of the vehicle.

In other words, the automotive front side frame 1 of the related art includes a bent portion 30 having a non-linear form and is divided into an inner portion and an outer portion. Each of the inner portion and the outer portion has been formed to have a single material and the same characteristics. The automotive front side frame 1 of the related art satisfies a frontal crash performance test. However, there was a problem in which a result of a small overlap crash test has not satisfied target performance, and an exemplary embodiment has solved the problem.

In more detail, in order to satisfy the small overlap crash test, a structure to improve strength of the automotive front side frame 1 has been considered as the easiest method. In a case in which the automotive front side frame 1 is manufactured using high strength steel of 1 GPa or higher, transformation of a component may be minimized, thereby minimizing transformation of a passenger cabin in which a vehicle passenger is seated.

However, in a case in which the automotive front side frame 1 including the bent portion 30 is formed to have high strength, there was a limitation in which a deceleration rate is instantaneously increased in a frontal crash F, so that a target value of the small overlap crash performance test may not be satisfied.

Figure 1:
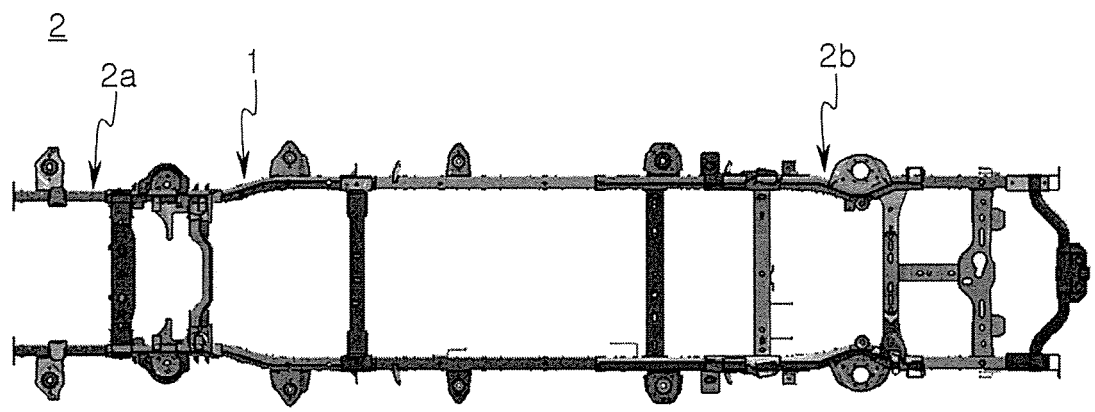
FIG. 1 is a top view of an automotive frame to which an automotive front side frame of the related art is applied.
Figure 2:
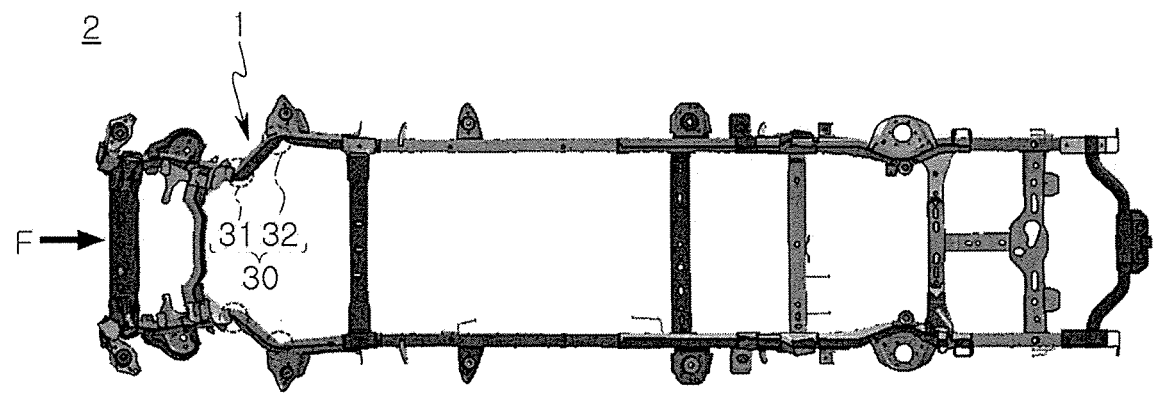
FIG. 2 is a top view of the automotive frame to which an automotive front side frame of the related art is applied, in the event of a frontal crash.
Figure 3:
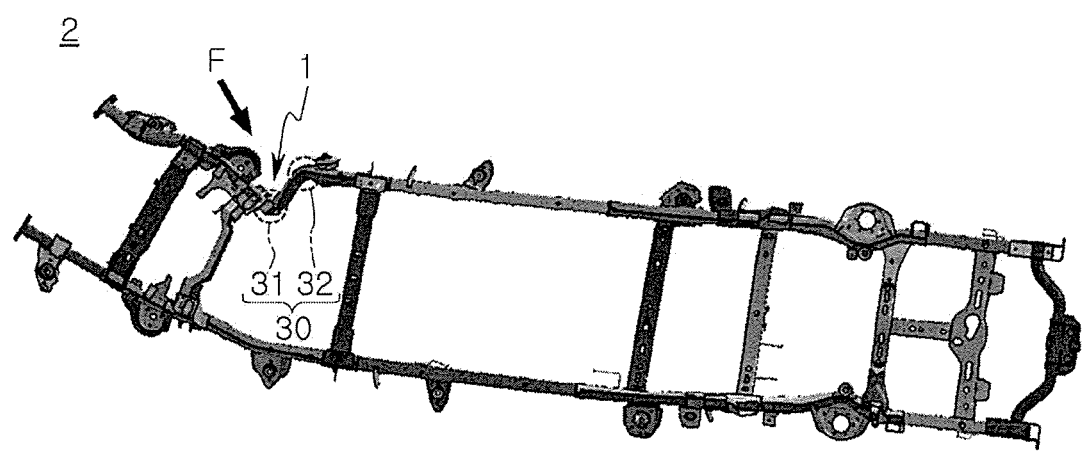
FIGS. 3 and 4 are a top view and a perspective view of the automotive frame to which an automotive front side frame of the related art is applied, in the event of a small overlap crash.
Figure 4:
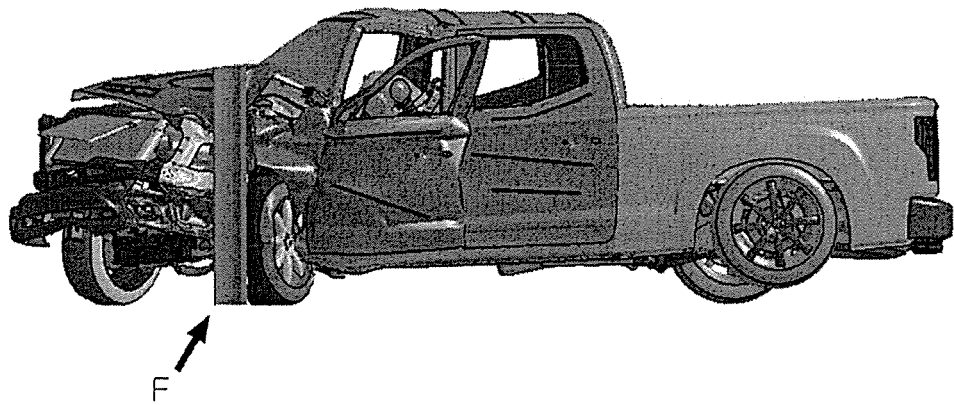
Figure 5:
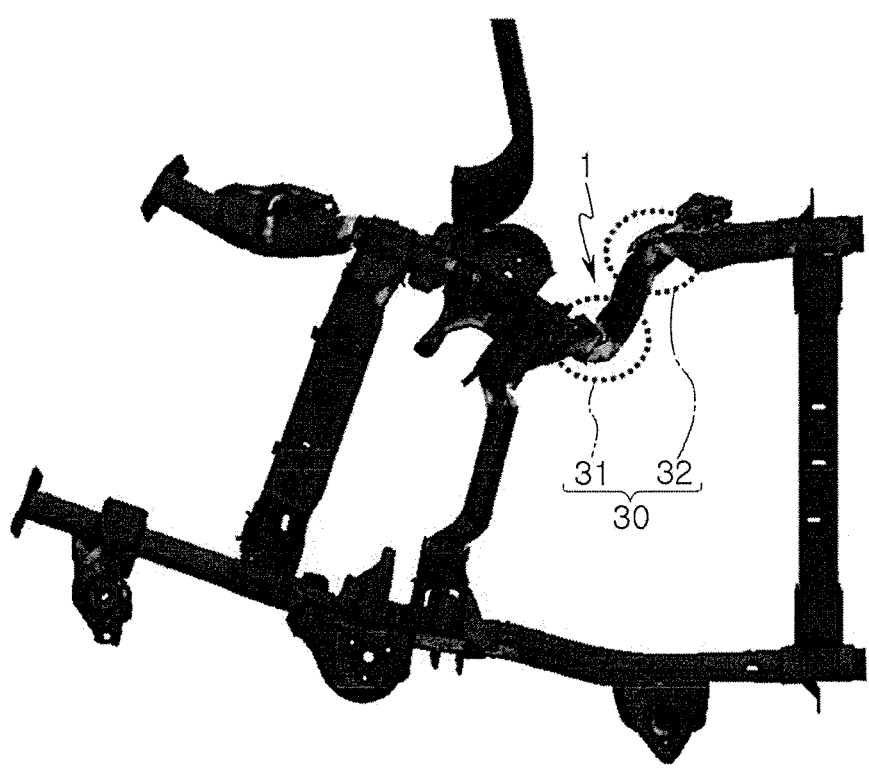
FIG. 5 is atop view illustrating a result of the small overlap crash in a case in which a material of 1 GPa or higher is applied to an automotive front side frame.

In addition, as illustrated in FIG. 5, in the small overlap crash test, folding in which a radius of curvature is substantially close to 0 may occur in the bent portion 30 in which a bending process is performed, so that transformation is intensively concentrated. Thus, there has been a problem in which a high strength material of 1 GPa or higher is easily damaged due to extreme plastic deformation.

In order to prevent the problem described above, a structure of FIG. 6 has been proposed in an exemplary embodiment. Here, FIG. 6 is an exploded perspective view of an automotive front side frame 1 according to an exemplary embodiment.

Figure 6:
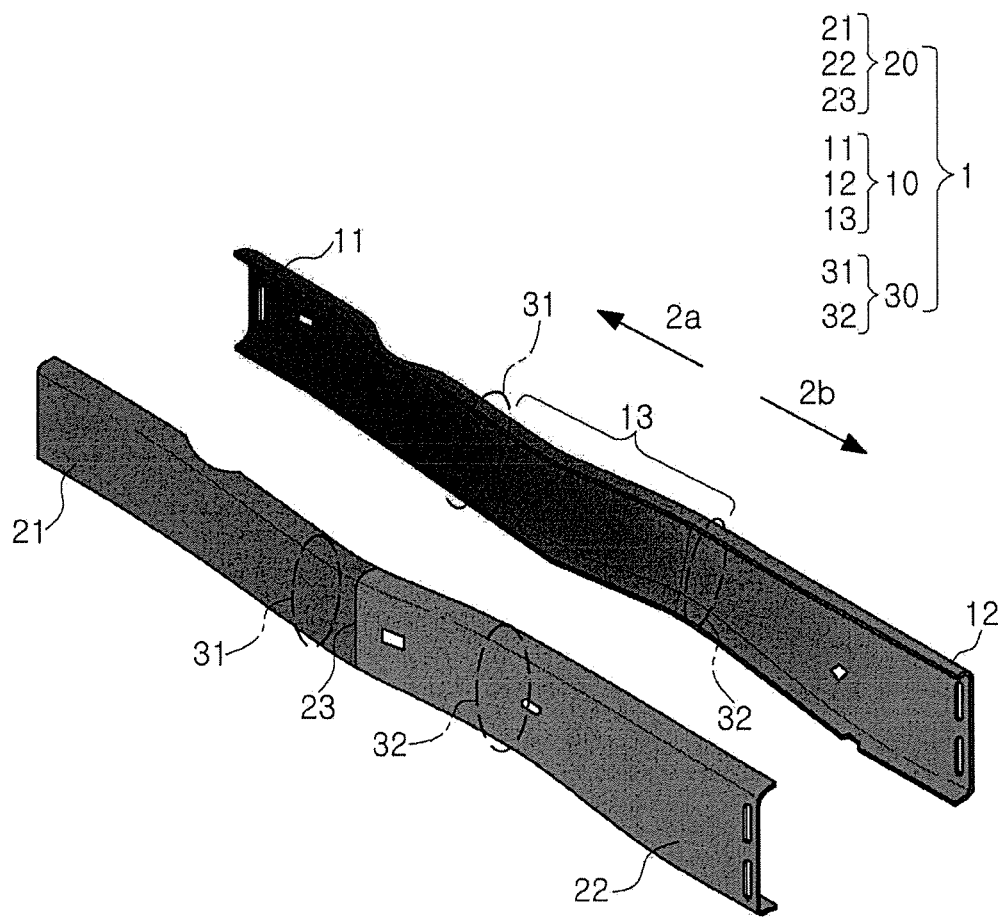
FIG. 6 is an exploded perspective view of an automotive front side frame according to an exemplary embodiment.

With reference to FIG. 6, the automotive front side frame 1 according to an exemplary embodiment is provided as an automotive front side frame 1 including a bent portion 30 having a curved form in at least a portion. The automotive front side frame 1 may comprise an outer frame 10 including a front outer portion 11 and a rear outer portion 12 provided further to a rear 2b of a vehicle frame 2 than the front outer portion 11 and having tensile strength higher than that of the front outer portion 11 and may comprise an inner frame 20 including a front inner portion 21 and a rear inner portion 22 provided further to the rear 2b of the vehicle frame 2 than the front inner portion 21 and having tensile strength higher than that of the front inner portion 21.

In other words, in an exemplary embodiment, front portions and rear portions of the outer frame 10 and the inner frame 20 of an automotive front side frame may be formed to have different materials or characteristics.

The automotive front side frame 1 according to an exemplary embodiment may also include the bent portion 30 having a curved form. The bent portion 30 has a form to allow an engine to be mounted therein. In a case in which the automotive front side frame 1 is formed to be a frame having the same material and characteristics, as described above, transformation may easily occur in the event of a crash F.

In the meantime, in an exemplary embodiment, a material or characteristics of the front portions and rear portions of the outer frame 10 and the inner frame 20 may be formed to be different. Thus, a design structure, in which the bent portion 30 is not damaged or transformation occurring in the bent portion 30 is reduced, even in the case in which transformation occurs in the bent portion 30, has been proposed.

The outer frame 10 is a frame disposed in an outer direction of a vehicle and includes the front outer portion 11 and the rear outer portion 12.

Here, the rear outer portion 12 is provided further to the rear 2b of the vehicle frame 2 than the front outer portion 11 and is formed to have tensile strength higher than that of the front outer portion 11, thereby inducing the front outer portion 11 to mitigate effects of a crash F in the event of a frontal crash F.

In addition, in the case of the outer frame 10, a heat treatment (MS-HPF, or the like) is performed by dividing a front sector and a rear sector so that tensile strength of the front outer portion 11 and the rear outer portion 12 may be formed to be different.

In other words, the outer frame 10 of the automotive front side frame 1 according to an exemplary embodiment may be formed by rapidly cooling the rear outer portion 12 faster than the front outer portion 11 to allow the rear outer portion 12 to be heat-treated to have tensile strength higher than that of the front outer portion 11.

Here, a difference in heat treatment temperatures between the front outer portion 11 and the rear outer portion 12 may be set to be a temperature difference to cause a difference in required tensile strength.

In the case of tensile strength by heat treatment described above, the rear outer portion 12 may be set to be 1100 MPa to 1500 MPa to be formed to have high strength of 1 GPa or higher. Thus, a target value may also be satisfied in an overlap crash performance test.

In other words, the front outer portion 11 and the rear outer portion 12 of the automotive front side frame 1 according to an exemplary embodiment may be formed using a material having a tensile strength of 600 MPa to 800 MPa before heat treatment, and the rear outer portion 12 may be formed in such a manner that tensile strength after heat treatment is changed to 1100 MPa to 1500 MPa.

In the meantime, the front outer portion 11 is set to have tensile strength lower than that of the rear outer portion 12 to be formed to have high strength of 1 GPa or higher, thereby preventing a problem in which the bent portion 30 is damaged.

In more detail, a transition portion 13, a portion in which the front outer portion 11 is transformed into the rear outer portion 12 may be set not to overlap the bent portion 30, thereby partially preventing the problem in which the bent portion 30 is damaged.

The outer frame 10 of the automotive front side frame 1 according to an exemplary embodiment may further comprise the transition portion 13, a transition zone in which the front outer portion 11 is changed to the rear outer portion 12. The transition portion 13 may be disposed in a portion not including a portion in which the bent portion 30 is formed.

Furthermore, in order to minimize damage occurring in the bent portion 30, the transition portion 13 may be provided between a first bent portion 31 and a second bent portion 32 of the bent portion 30.

In other words, the bent portion 30 of the automotive front side frame 1 according to an exemplary embodiment may comprise the first bent portion 31 and the second bent portion 32 formed further to the rear 2b of the vehicle frame 2 than the first bent portion 31. The transition portion 13 may be provided in a position between the first bent portion 31 and the second bent portion 32.

In other words, the first bent portion 31 is disposed in the front outer portion 11, while the second bent portion 32 is disposed in the rear outer portion 12. Transformation is concentrated in the first bent portion 31 disposed in the front outer portion 11 having a relatively low degree of tensile strength in the event of a frontal crash F or a small overlap crash F. However, since the front outer portion 11 has a relatively low degree of strength, lower than 1 GPa, damage caused by bending may be prevented.

In the meantime, since transformation is not concentrated in the second bent portion 32 disposed in the rear outer portion 12 having a relatively high degree of tensile strength, a situation of entire folding having a radius of curvature close to 0 does not occur. Thus, a damage problem caused thereby does not occur.

The inner frame 20 is provided as a frame disposed in an internal direction of a vehicle and includes the front inner portion 21 and the rear inner portion 22.

Here, the rear inner portion 22 is provided further to the rear 2b of the vehicle frame 2 than the front inner portion 21 and is formed to have tensile strength higher than that of the front outer portion 11, thereby inducing the front inner portion 21 to mitigate effects of a crash F in the event of the frontal crash F.

In addition, the inner frame 20 includes the front inner portion 21 and the rear inner portion 22 using the TWB so that tensile strength of the front inner portion 21 and the rear inner portion 22 may be formed to be different.

In other words, the inner frame 20 of the automotive front side frame 1 according to an exemplary embodiment may be molded using the TWB so that the rear inner portion 22 may be formed using a material having tensile strength higher than that of the front inner portion 21.

In this case, a difference in tensile strength of a material forming the front inner portion 21 and the rear inner portion 22 may be within a range of 300 MPa to 900 MPa.

The front inner portion 21 of the automotive front side frame 1 according to an exemplary embodiment may be formed using a material having tensile strength of 600 MPa to 800 MPa, and the rear inner portion 22 may be formed using TWIP steel having tensile strength of 1100 MPa to 1500 MPa and an elongation percentage of 15% to 60%.

As a result, the rear inner portion 22 may be set to have tensile strength of 1100 MPa to 1500 MPa to be formed to have high strength of 1 GPa or higher. Thus, a target value may also be satisfied in the overlap crash performance test.

In the meantime, the front inner portion 21 is set to have tensile strength lower than that of the rear inner portion 22 to be formed to have high strength of 1 GPa or higher, thereby preventing a problem in which the bent portion 30 is damaged.

In more detail, a joint portion 23, a portion connecting the front inner portion 21 to the rear inner portion 22, may be set not to overlap the bent portion 30, thereby partially preventing the problem in which the bent portion 30 is damaged.

In other words, the inner frame 20 of the automotive front side frame 1 according to an exemplary embodiment may further comprise the joint portion 23 connecting the front inner portion 21 to the rear inner portion 22. The joint portion 23 may be disposed in a portion not including a portion in which the bent portion 30 is formed.

Furthermore, in order to minimize damage occurring in the bent portion 30, the joint portion 23 may be provided between the first bent portion 31 and the second bent portion 32 of the bent portion 30.

In other words, the bent portion 30 of the automotive front side frame 1 according to an exemplary embodiment may comprise the first bent portion 31 and the second bent portion 32 formed further to the rear 2b of the vehicle frame 2 than the first bent portion 31. The joint portion 23 may be provided in a position between the first bent portion 31 and the second bent portion 32.

In other words, the first bent portion 31 is disposed in the front inner portion 21, while the second bent portion 32 is disposed in the rear inner portion 22. Transformation is concentrated in the first bent portion 31 disposed in the front inner portion 21 having a relatively low degree of tensile strength in the event of the frontal crash F or the small overlap crash F. However, since the front inner portion 21 has a relatively low degree of strength, lower than 1 GPa, damage caused by bending may be prevented.

In the meantime, since transformation is not concentrated in the second bent portion 32 disposed in the rear inner portion 22 having a relatively high degree of tensile strength, a situation of entire folding having a radius of curvature close to 0 does not occur. Thus, a damage problem caused thereby does not occur.

In detail, the rear inner portion 22 is directly provided using a high strength material without being heat-treated, since the rear outer portion 12 is tensioned when bending of the second bent portion 32 occurs, and the rear inner portion 22 is likely to be compressed and transformed, as well as is likely to be damaged in the event of being compressed and transformed, as described above.

In the meantime, in a case in which the high strength material is directly used, a problem in which weight thereof is increased occurs. Thus, the rear outer portion 12 is provided to have a desired degree of tensile strength by heat treating a relatively lightweight material.

It can be confirmed whether the automotive front side frame 1 of an exemplary embodiment satisfies required performance, with reference to FIGS. 7 to 10.

Figure 7:
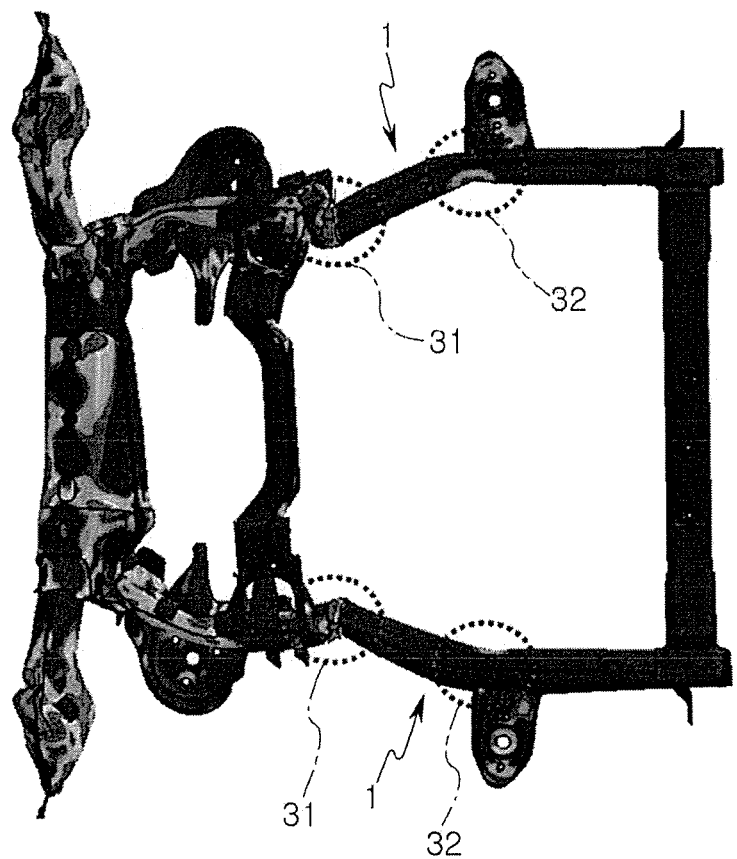
FIG. 7 is a top view of an automotive front side frame according to an exemplary embodiment, in the event of the frontal crash.
Figures 8, 9:
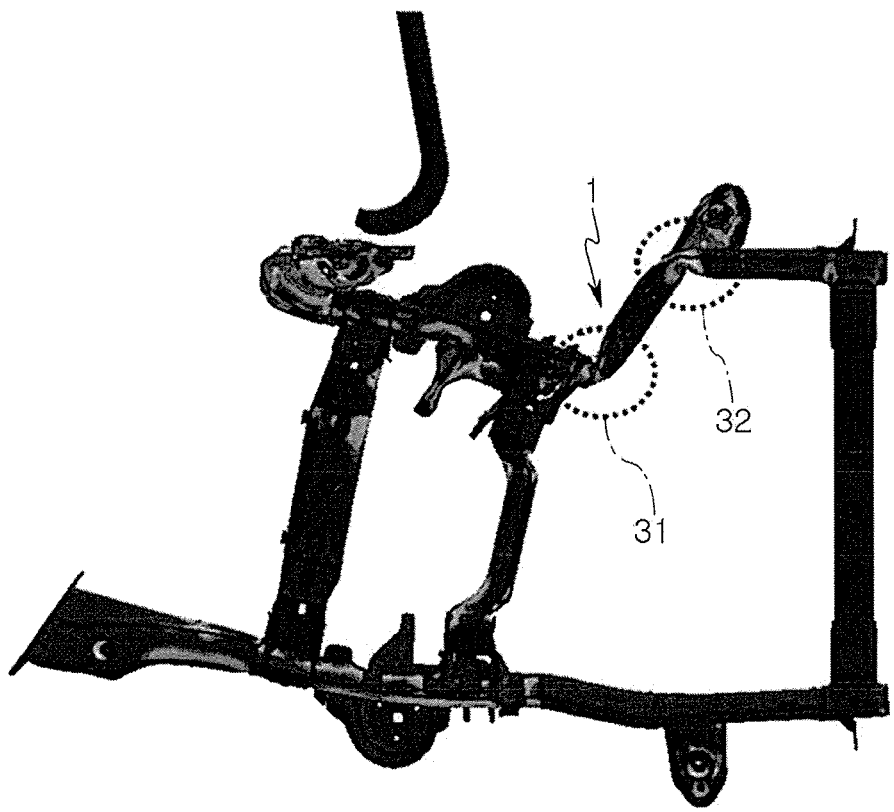
FIG. 8 is a top view of an automotive front side frame according to an exemplary embodiment, in the event of the small overlap crash.
FIG. 9 is a table illustrating comparison results of automotive front side frames of an exemplary embodiment and of the related art, in the event of the frontal crash.

FIG. 7 is a top view of an automotive front side frame 1 according to an exemplary embodiment, in the event of a frontal crash, while FIG. 8 is a top view of the automotive front side frame 1 according to an exemplary embodiment, in the event of a small overlap crash.

In addition, FIG. 9 is a table illustrating a comparison result of the automotive front side frames 1 of an exemplary embodiment and the related art in the event of a frontal crash F. FIG. 10 is a table illustrating a comparison result of the automotive front side frames 1 of an exemplary embodiment and the related art in the event of a small overlap crash F.

As confirmed in FIG. 7, it can be confirmed that transformation in a rear portion does not substantially occur in the event of the frontal crash F, so that transformation in a second bent portion 32 does not substantially occur, either.

In addition, it can be confirmed that, in the case of FIG. 8 as well, transformation in the rear portion does not substantially occur in the event of the small overlap crash F, so that transformation in the second bent portion 32 does not substantially occur, either.

In a case in which descriptions above are numerically confirmed, as illustrated in a table of FIG. 9, it can be confirmed that target values of TTZV, maximum deceleration rate, and effective deceleration rate until a speed of a pick-up truck reaches 0 after a crash F into a steel wall, not satisfied by a model of the related art in the event of a frontal crash, are satisfied.

In addition, a table of FIG. 10 illustrates numerical values in the event of the small overlap crash F, and it can be confirmed that the numerical values satisfy an entirety of evaluation indices not satisfied by a model of the related art.

Hereinafter, exemplary embodiments of the present disclosure will be described in detail with reference to the accompanying drawings. The disclosure may, however, be exemplified in many different forms and should not be construed as being limited to the specific embodiments set forth herein, and those skilled in the art and understanding the present disclosure could easily accomplish retrogressive inventions or other embodiments included in the scope of the present disclosure by the addition, modification, and removal of components within the same scope, but those are to be construed as being included within the scope of the present disclosure. Like reference numerals will be used to designate like components having similar functions throughout the drawings within the scope of the present disclosure.

While exemplary embodiments have been shown and described above, it will be apparent to those skilled in the art that modifications and variations could be made without departing from the scope of the present invention as defined by the appended claims.

The invention claimed is:

1. An automotive front side frame comprising:
   an outer frame comprising a front outer portion and a rear outer portion located at a rear of a vehicle frame than the front outer portion;
   an inner frame comprising a front inner portion and a rear inner portion located at a rear of the vehicle frame than the front inner portion;
   wherein a tensile strength of the rear outer portion is higher than a tensile strength of the front outer portion,
   wherein a difference between the tensile strength of the rear outer portion and the tensile strength of the front outer portion is 300 MPa to 900 MPa,
   wherein a tensile strength of the rear inner portion is higher than a tensile strength of the front inner portion,
   wherein a difference between the tensile strength of the rear inner portion and the tensile strength of the front inner portion is 300 MPa to 900 MPa.

2. The automotive front side frame of claim 1, wherein the inner frame is molded using a tailor welded blank (TWB) to allow the rear inner portion to be formed using a material having tensile strength higher than tensile strength of the front inner portion.

3. The automotive front side frame of claim 2, wherein the outer frame is formed by rapidly cooling the rear outer portion faster than the front outer portion to allow the rear outer portion to be heat-treated to have tensile strength higher than tensile strength of the front outer portion.

4. The automotive front side frame of claim 3,
   wherein the tensile strength of the rear outer portion and the tensile strength of the rear inner portion are 1100 MPa to 1500 MPa,
   wherein the tensile strength of the front outer portion and the tensile strength of the front inner portion are 600 MPa to 800 MPa.

5. The automotive front side frame of claim 1,
   wherein the front inner portion comprises a first bent portion of the inner frame,
   wherein the rear inner portion comprises a second bent portion of the inner frame, and
   wherein the inner frame comprises a joint portion connecting the first bent portion of the inner frame and the second bent portion of the inner fame.

6. The automotive front side frame of claim 5,
   wherein the outer frame comprises a transition portion connecting the front outer frame and the rear outer portion, wherein the outer frame comprises a first bent portion of the outer frame between the front outer frame and the transition portion, wherein the outer frame comprises a second bent portion of the outer frame between the transition portion and the rear outer frame.

7. The automotive front side frame of claim 6, wherein the joint portion does not overlap with the first bent portion of the outer frame and the second bent portion of the outer frame.

8. The automotive front side frame of claim 6, wherein the transition portion overlaps with the joint portion.

\* \* \* \* \*